United States Patent [19]

Tokuhara et al.

[11] 4,259,688
[45] Mar. 31, 1981

[54] TV CAMERA

[75] Inventors: Mitsuhiro Tokuhara, Chigasaki; Tetsuo Sueda, Chofu; Kazuo Tanaka, Tokyo; Ryusho Hirose, Yokosuka, all of Japan

[73] Assignee: Canon Kabushiki Kaisha, Tokyo, Japan

[21] Appl. No.: 45,409

[22] Filed: Jun. 4, 1979

[30] Foreign Application Priority Data

Jun. 6, 1978 [JP] Japan .................................. 53-68053

[51] Int. Cl.³ .............................................. H04N 4/18
[52] U.S. Cl. .................................... 358/107; 358/108; 358/183
[58] Field of Search ............... 358/107, 108, 183, 209, 358/225

[56] References Cited

U.S. PATENT DOCUMENTS

| | | | |
|---|---|---|---|
| 2,568,166 | 9/1951 | Perry | 358/183 |
| 4,009,960 | 3/1977 | Feldman et al. | 358/107 |
| 4,167,756 | 9/1979 | Smith | 358/108 |

Primary Examiner—Richard Murray
Attorney, Agent, or Firm—Fitzpatrick, Cella, Harper & Scinto

[57] ABSTRACT

A TV camera which can detect any object distance. The image pick-up surface of the TV camera is divided into an object image forming surface and a range finding image forming surface. The object distance can be detected by reading the range finding image.

3 Claims, 5 Drawing Figures

TV CAMERA

BACKGROUND OF THE INVENTION

1. Field of the Invention

This invention relates to a TV camera, and more particularly to a TV camera which can detect any object distance.

2. Description of the Prior Art

A TV camera in which a range finding object image can be formed on the image-receiving surface of an image pick-up device by a range finding optical system to thereby provide a range finding signal is disclosed U.S. Pat. No. 4,009,960.

However, in such TV camera, the range finding object image is formed on the entire image receiving surface of the image pick-up device and therefore, photography of an object and detection of the object distance had to be effected at entirely different times. For this reason, such TV camera has not been so practical as a TV camera for photographing a continuous image of an object.

SUMMARY OF THE INVENTION

The present invention has been made in view of the above point and is characterized in that an object image forming portion and a range finding object image forming portion are provided on the light-receiving surface of an image pick-up device so that an object image is formed on the object image forming portion by an objective lens and a range finding object image is formed on the range finding object image forming portion by a range finding optical system. This makes it possible that after the scanning of the object image has been completed, the range finding object can be scanned for the time until the scanning of the object image is resumed. Accordingly, strictly, the time for scanning the object image differs from the time for scanning the range finding object image, but as compared with the aforementioned known example, photography of the object image and detection of the object distance may take place at the same time. This makes it possible always to photograph an image of a focused point if the object is a moving object.

The invention will become fully apparent from the following detailed description thereof taken in conjunction with the accompanying drawings.

DESCRIPTION OF THE PREFERRED EMBODIMENTS

Figure 1:
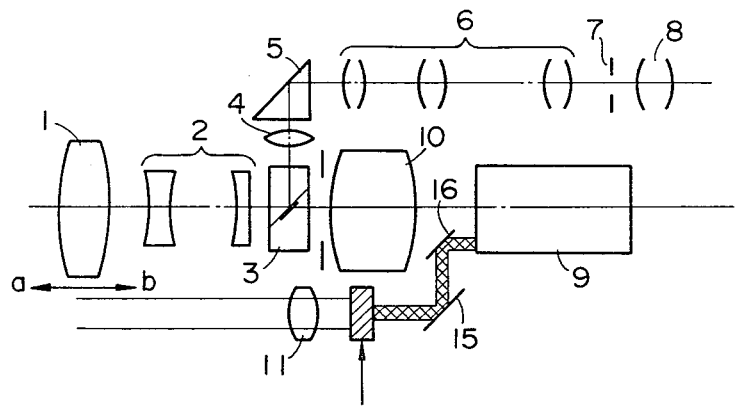
FIG. 1 schematically shows the optical arrangement of the TV camera according to the present invention.

Referring to FIG. 1 which schematically shows the optical arrangement of the TV camera according to the present invention, there is seen a focusing lens 1 movable on an optical axis along the direction of arrow a ←→b, a zoom lens group 2 including a variator and a compensator, a beam splitter 3 for directing part of the light from an object to a finder optical system 4, 5, 6, 7, 8 and an image pick-up device 9 having an image receiving surface. The image pick-up device 9 may be an image pick-up tube or a solid image pick-up element. Designated by 10 is a relay lens. Optical elements 11, 12, 13, 14, 15 and 16 together constitute a range finding optical system. More particularly, the range finding optical system has the image forming lens 11, the stationary mirror 12, a prism P having reflecting surfaces, the stationary mirror 14, and the mirrors 15 and 16 for directing the light from the prism P to the image pick-up tube 9.

Figure 2:
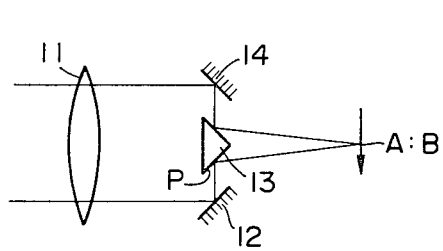
FIG. 2 shows details of the range finding optical system of FIG. 1.
Figure 3:
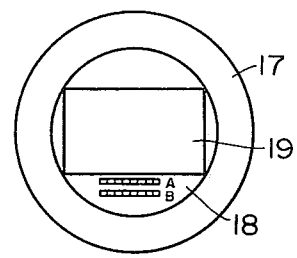
FIGS. 3 and 4 show the surface of the image pick-up device.

By the objective lenses 1, 2, 10 and image of the object is formed on an object image forming portion 19 surface-divided in the direction along the horizontal scanning lines on the image pick-up screen 18 of the image pick-up tube surface 17, as shown in FIG. 3, and by the range finding optical system 11-16, the images A and B of the central portion of the obejct are formed on the range finding object image forming portion of the image pick-up screen 18. In order to prevent overlapping of the images A and B, a mask member may be disposed in the range finding optical system, if required. The images A and B need not be at the same position of the central portion of the object, but may be vertically deviated from each other by 1 pitch. If it is desired to obtain an image having no pitch deviation, one of the reflecting surfaces of the prism P in FIG. 2 may be inclined with respect to a plane orthogonal to the plane of the drawing sheet.

Figure 4:
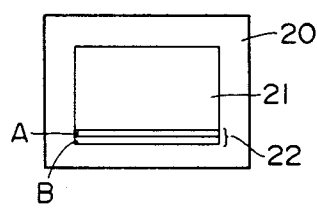

FIG. 4 shows an example which employs a solid image pick-up element instead of an image pick-up tube. An object image is formed on a portion 21 of the image pick-up screen 20 of the solid image pick-up element by the objective lenses, and images A and B formed on a portion 22 by the range finding optical system.

Figure 5:
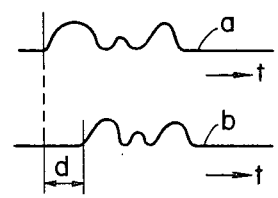
FIG. 5 illustrates range finding signals.

Description will now be made of the operation. After the scanning of the object image forming portions 19 and 21 has been completed, the images A and B are scanned unitl the scanning of these portions is resumed. Signals obtained in this case are such as shown by (a) and (b) in FIG. 5. The phase difference of the signals (a) and (b) corresponds to the object distance and therefore, this phase difference d is measured by a circuit, not shown. The object distance is operated by an object distance operating circuit on the basis of th phase difference d so obtained, and the lens 1 is moved over a predetermined amount for focusing by a focusing lens driving mechanism such as a servomotor, not shown.

What we claim is:

1. A TV camera comprising:
    an image pick-up device for forming an image of an object for TV display on an object image forming portion of the image pick-up screen of the image pick-up device, and
    a range finding optical system for forming a range finding image of said object, including information of the distance between said object and the TV camera, on a range finding image forming portion of said image pick-up screen, said range finding image forming portion being in non-overlapping disposition with respect to said object image forming portion.

2. The TV camera according to claim 1, wherein said image pick-up device includes an image pick-up tube.

3. The TV camera according to claim 1, wherein said image pick-up device includes a solid image pick-up element.

* * * * *